United States Patent [19]

Wong

[11] 4,392,583

[45] Jul. 12, 1983

[54] CAP AND VALVE ASSEMBLY

[75] Inventor: Tom C. Wong, Saginaw, Mich.

[73] Assignee: General Motors Corporation, Detroit, Mich.

[21] Appl. No.: 271,682

[22] Filed: Jun. 8, 1981

[51] Int. Cl.³ .............................................. B65D 51/16
[52] U.S. Cl. .................................... 220/202; 220/208;
220/209; 220/295; 220/366; 417/211
[58] Field of Search .............. 220/202, 208, 209, 295,
220/366; 417/211

[56] References Cited

U.S. PATENT DOCUMENTS 2,622,762 12/1952 Parsons ............................... 220/209

FOREIGN PATENT DOCUMENTS 2324170 5/1973 Fed. Rep. of Germany ...... 220/209

Primary Examiner—Robert G. Nilson
Attorney, Agent, or Firm—Donald F. Scherer

[57] ABSTRACT

A cap and valve assembly for a liquid reservoir has a cover in which is disposed a flexible valve member. The flexible valve member has an annular sealing portion engaging the reservoir and a diaphragm portion. An air chamber is formed between the diaphragm portion and the cover, which chamber expands and contracts in response to mechanical vibrations of the reservoir, whereby air is drawn from atmosphere and pumped to the interior of the reservoir. The valve member is spring-loaded when the cap assembly is secured to the reservoir in a manner to assist the annular sealing contact and to establish the at rest volume of the air chamber.

1 Claim, 3 Drawing Figures

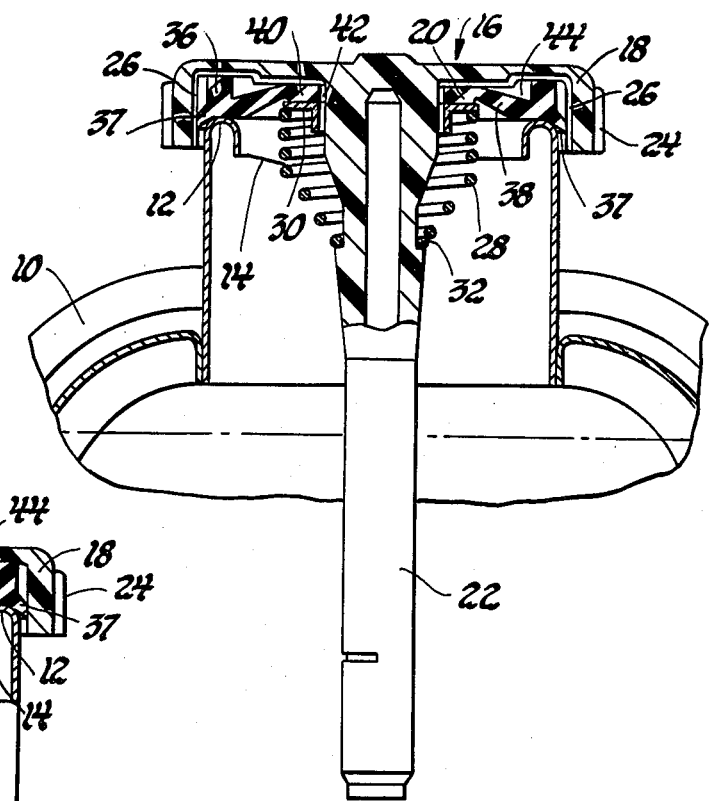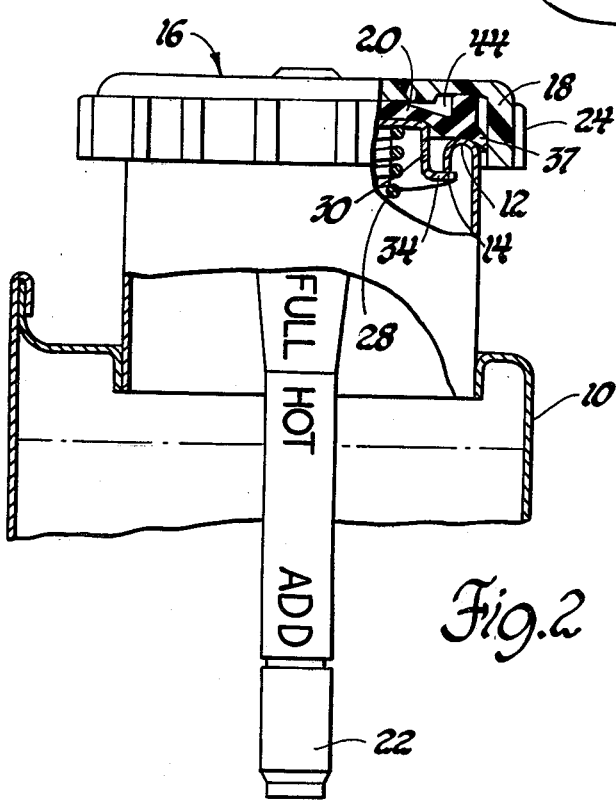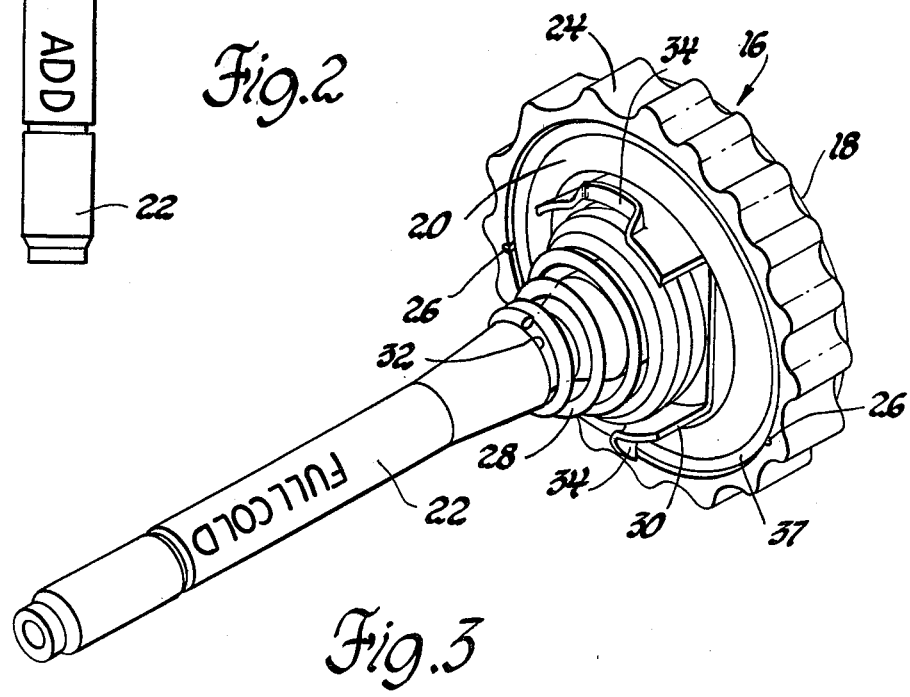

CAP AND VALVE ASSEMBLY

This invention relates to cap assemblies for liquid reservoirs and more particularly to such cap assemblies which incorporate valve mechanisms.

When a liquid reservoir is subjected to mechanical vibrations, it is possible for the liquid therein to foam to such an extent that it can leak through vent passages formed in the reservoir or in the reservoir closure member. This can be particularly true in liquid reservoirs which are utilized with automobiles and mounted on internal combustion engines. While this leakage is slight and not detrimental to the systems which are operated by the liquid, it is preferable that such leakage should not occur. The foaming of the liquid can be somewhat controlled by additives and also by pressurizing the air volume which is present above the liquid level in the reservoir. It is also possible to minimize this leakage by providing a circuitous vent passage.

The present invention prevents leakage by pressurizing the air volume of the reservoir. This pressurization occurs during operation whenever the reservoir is subjected to mechanical vibrations of random frequencies and amplitudes. The present invention incorporates a cap and valve assembly wherein an air chamber is formed between the inner surface of the cap and a flexible valve member. The flexible valve member is urged to movement by the vibrations imposed on the system, such that the air chamber will expand and contract relative to the at rest position thereof. As the air chamber contracts, the air displaced flows into the reservoir and when the air chamber expands, external air is drawn in.

The air movement is through air flow passages which provide varying degrees of flow resistance depending upon the particular mode of the valve member. A valve member also provides a seal between the reservoir and the cap at the portions not utilized as air flow passages. The sealing force and the primary or at rest volume of the air chamber is determined by a spring member which becomes operative when the cap member is placed in position on the reservoir.

It is therefore an object of this invention to provide an improved cap and valve assembly for a liquid reservoir which is subjected to mechanical vibrations wherein the valve assembly includes a flexible diaphragm member which provides a seal with the cap and a variable volume air chamber responsive to the reservoir vibrations such that air from the chamber is conducted to the reservoir when the chamber contracts and air is drawn from atmosphere when the chamber expands.

It is another object of this invention to provide an improved cap and valve assembly wherein the valve assembly includes air flow passages and an expansible air chamber to provide pressurization of the reservoir when subjected to mechanical vibrations and wherein a spring and latch assembly cooperates between the cap and reservoir to establish a sealing force on the valve assembly and to simultaneously fix the at rest volume of the air chamber.

These and other objects and advantages of the present invention will be more apparent from the following description and drawings in which:

FIG. 1 is an elevational sectional view showing a cap and valve assembly in position on a fluid reservoir;

FIG. 2 is a partial sectional view of another portion of the cap and valve assembly on the reservoir; and FIG. 3 is a perspective view of the cap and valve assembly.

Referring to the drawings, wherein like characters represent the same or corresponding parts throughout the several views, there is seen in FIGS. 1 and 2, a liquid reservoir 10 which is adapted to provide liquid storage or a hydrualic actuating device such as a power steering pump, not shown. Power steering pumps incorporating integral liquid reservoirs are well-known such that further description is not believed necessary.

The reservoir 10 has an annular lip portion 12 and a cam surface 14. The reservoir 10 is closed by a cap assembly, generally designated 16, which includes a cover 18 and a flexible valve member 20. The cover 18 has integrally formed therewith a stem 22 which extends into the reservoir 10 and can be utilized as a ullage rod. The cover 18 has an undulating surface 24 which provides a finger grip structure to assist in installing and removing the cap assembly 16.

The inner surface of cover 18 is substantially cup-shaped and includes at least two vent passages 26 which extend from the atmospheric side of the cap assembly across the inner surface of the cup-shaped portion of the cover 18 to the centrally located stem 22.

The flexible valve member 20 is disposed in the cover 18 and maintained in position by a spring 28 and latch member 30. The spring 28 is compressed between a step 32 formed on the stem 22 and the latch member 30. The latch 30 has a pair of locking ears 34 which are adapted to engage the cam surface 14 in a well-known manner. Those familiar with such latching mechanisms will appreciate that a pair of vertical slots are formed from the outer edge of the reservoir through the cam surface 14 so that the locking ears can be placed in position such that they can engage the cam surface 14 upon rotation of the cap assembly 16.

The flexible valve member 20 has an annular sealing portion 36 and an annular lip portion 37. The flexible diaphragm portion 38 is disposed radially inward from the annular sealing portion 36 and a stem engaging annular portion 40 disposed adjacent the stem 22. The portion 40 has a pair of axial air passages 42 formed therein which communicate with the interior of the reservoir through a clearance path formed between the stem 22 and the latch member 30. The stem 22 has a pair of flats formed thereon which cooperate with flats formed on latch member 30 to provide a drive connection therebetween.

The flexible diaphragm portion 38 cooperates with the inner surface of the cover 18 to form an annular air chamber 44 between the annular sealing portion 36 and the annular portion 40. The air chamber 44 is in communication with passages 26 and passages 42.

When the cap assembly 16 is secured on the reservoir 10, the locking ears 34 engage the cam surface 14 and attempt to compress the spring 28. The spring compression force reacts through step 32 to stem 22 and therefore to the cover 18. The force on the cover 18 is transmitted to the annular seal portion 36 such that this portion is compressed and the at rest air volume of air chamber 44 is established. Since the reservoir 10 is secured to a source of mechanical vibration such as an internal combustion engine, these vibrations are transmitted from the annular lip 12 to the cover 18 through the annular sealing portion 36. The cover 18 has some inertia so that its movement will not be simultaneous with the movement of reservoir 10. The difference in movement between these components causes an expansion and contraction of the air chamber 44 such that air movement to and from the chamber 44 must take place.

When the chamber is contracting, the minimum restriction to air flow is via passages 42 such that the majority of air flow during contraction is from chamber 44 through passages 42 to the interior of reservoir 10. Some of the air flow from air chamber 44 will also pass from chamber 44 through passages 26 to atmosphere.

As the chamber 44 expands, the minimum restriction to air flow is via passages 26 such that the majority of the air flow required to refill chamber 44 will come from atmosphere. Therefore, as the operating time is extended, the air pressure in reservoir 10 will increase above atmosphere due to the air flow such that fluid leakage will not occur because of this increased internal pressure. The fluid leakage is also minimized by the air flow which occurs in the passages 42.

From the above description, it will be appreciated that the pressurizing of reservoir 10 occurs without expending any additional energy which is not already presently used within the system. While the pressurization of the reservoir 10 will be slight, it is sufficient to raise the interior pressure above atmospheric pressure which will assist in preventing foaming of the hydraulic fluid and maintain substantially zero leakage.

The characteristics of the pumping action can be changed by changing the flexibility of the diaphragm 38 and the inertia of the various components within the system. It will also be appreciated by those skilled in the art that the pumping action will be somewhat determined by the frequency of vibrations, however, such devices on internal combustion engines subject the system to random mechanical vibrations during various phases of operation. If a fixed frequency is established, then the various characteristics of the valve and cap assembly can be varied to attain the maximum efficiency of the pumping action.

The embodiments of the invention in which an exclusive property or privilege is claimed are defined as follows:

1. A cap assembly for a liquid reservoir subjected to mechanical vibrations of randon frequencies and amplitudes; said cap assembly comprising a substantially cup-shaped cover member, latching means for securing the cover member to the reservoir, and a central stem portion integral with said cover extending into the reservoir when said cap assembly is placed on the reservoir; a flexible valve member adjacent the interior surface of the cover member and including an annular sealing portion contacting the reservoir and cover member, and a diaphragm portion disposed between the annular seal portion and said central stem and cooperating with the cover to form an air chamber means which expands and contracts in response to the mechanical vibrations of random frequencies and amplitudes; inlet air passage means in said cover member for communicating air from atmosphere to said air chamber means during expansion thereof; outlet air passage means between said stem portion and said valve member for communicating air from said air chamber means to the interior of said reservoir; said inlet passage means having greater resistance to air flow than said outlet passage during contraction of said air chamber means such that pulsating air flow into said reservoir minimizes liquid leakage therefrom; and spring means compressed between said latching means and said central stem for transmitting a force through said cover to aid the sealing at the annular sealing portion and to establish the at rest volume of the air chamber means.

* * * * *